United States Patent [19]

Sawhill

[11] Patent Number: 5,656,309

[45] Date of Patent: Aug. 12, 1997

[54] METHODS FOR PRODUCING A STABLE FAT SUSPENSION FEED SUPPLEMENT

[75] Inventor: J. Wallace Sawhill, Canoga Park, Calif.

[73] Assignee: Pacific Kenyon Corporation, Long Beach, Calif.

[21] Appl. No.: 58,130

[22] Filed: May 10, 1993

[51] Int. Cl.$^6$ .......................... A23C 21/02; A23L 1/305; A23J 1/16; A23K 1/06

[52] U.S. Cl. .................. 426/41; 426/42; 426/72; 426/74; 426/520; 426/573; 426/656; 426/657; 426/807

[58] Field of Search ................. 426/573, 42, 34, 426/41, 72, 74, 520, 656, 657, 807

[56] References Cited

U.S. PATENT DOCUMENTS

| | | | |
|---|---|---|---|
| 2,254,241 | 9/1941 | Pittman et al. | 426/41 |
| 2,465,905 | 3/1949 | Meade et al. | 426/41 |
| 3,974,294 | 8/1976 | Schwille et al. | 426/32 |
| 4,143,174 | 3/1979 | Shah et al. | 426/570 |
| 4,160,041 | 7/1979 | Schroeder et al. | 426/69 |
| 4,267,197 | 5/1981 | Sawhill | 426/69 |
| 4,547,386 | 10/1985 | Chambers et al. | 426/583 |
| 4,780,325 | 10/1988 | Miller | 426/54 |
| 4,804,546 | 2/1989 | Sawhill | 426/69 |

FOREIGN PATENT DOCUMENTS 473295  10/1973  Australia .

OTHER PUBLICATIONS

Hawley's Condensed Chemical Dictionary 12th Ed., VNR Company, New York, 1993, pp. 50 & 1011.

*Primary Examiner*—Esther Kepplinger
*Assistant Examiner*—Curtis E. Sherrer
*Attorney, Agent, or Firm*—Plante & Strauss

[57] ABSTRACT

There is disclosed a stable animal feed supplement suspension which is prepared by forming a stable liquid gel in concentrated food industry by-products such as by-products of the dairy industry, such as whey permeates, delactosed whey, and by-products of the fermentation industry, such as whey and corn sweet water. These by-products have not been used with any significant success in animal feed supplements, despite their low cost and disposal problems. A major disadvantage is their limited solubility, and the resultant instability of concentrates of the by-products. The invention comprises the treatment of the protein-rich by-products with a mild enzymatic treatment which stabilizes the by-products against protein gelation, and the thermal, and/or enzymatic treatment of the lactose-rich by-products to avoid separation of the lactose from concentrates. The by-products can then be concentrated to high solids content, in excess of 50 weight percent, and the resultant concentrates can be treated with gelation agents, preferably phosphoric acid and lime to form stable liquid gels, to which feed nutrients such as fats, urea, sodium bicarbonate, calcium carbonate, calcium sulfate, etc., or drugs such as monisan, can be added, forming a stable liquid suspension which is useful as an animal feed supplement.

20 Claims, No Drawings

METHODS FOR PRODUCING A STABLE FAT SUSPENSION FEED SUPPLEMENT

BACKGROUND OF THE INVENTION

1. Field of Invention

This invention relates to animal feed supplements formed as liquid gels and containing a substantial quantity of solid feed nutrients suspended in the gels.

2. Brief Statement of the Prior Art

Sugar and protein containing by-products of the feed industry are commonly used in diets for domestic animals; often added as liquids to the animals' daily feed ration. Phosphates have been added to the supplements as a source of dietary phosphorous; urea has been added to supply non-protein nitrogen; and fats have been included, as described in U.S. Pat. No. 2,793,952. Vitamins have been included in these supplements as described in U.S. Pat. No. 2,807,546.

Most liquid supplements are made by suspending insoluble feed ingredients in molasses with suspension agents such as phospholipids, lecithin, clays, gums and the like. These attempts have found only limited success, as the resultant suspensions cannot retain greater than about 10 weight percent of an insoluble ingredient, such as fat. The suspensions also have limited stability, a problem which is particularly acute when drugs or medications such as monisan are included in the supplement. When settling occurs, as it invariably has in the past, the animals are not provided with a uniform feed ration and imbalances in the feeding program result, causing poor feed efficiency and low gains.

Examples of suspensions of solid feed nutrients and fat in animal feed supplements are described in my prior U.S. Pat. Nos. 4,267,197; 4,804,546; and 4,937,082. The invention disclosed in the '197 patent is the formation of a thixotropic gel carrier for powdered solid feed nutrients and fat by adding a phosphate salt to a sugar solution such as molasses, condensed wheys, and lignin sulfonates to form a stable liquid gel. The maximum amount of fat which can be suspended for adequate storage times with this technique is about 10 weight percent, although greater amounts can be temporarily suspended. The patent cautions against use of wheys which are so concentrated that lactose will precipitate during storage.

The invention disclosed in the '546 patent permits suspension of greater amounts of fats in sugar solutions such as molasses by dispersing melted fat in the sugar solution. The invention disclosed in the '082 patent is a method to form a liquid gel by the addition of phosphoric acid and calcium hydroxide to sugar solutions such as molasses or condensed wheys. This method permits dilution of the liquid gel to sugar contents less than required for the other methods. Gels with increased water contents are desirable because of lower ingredient costs and because greater amounts of other nutrients such as fat or limestone can be suspended in these gels than in more conventional suspensions.

Liquid feed supplements have also been prepared by the addition of water, ammonium polyphosphate and calcium chloride to molasses, as described in U.S. Pat. No. 3,962,484. If the calcium chloride is added to molasses before the ammonium polyphosphate, excessive gelling and precipitation will occur, as reported in depth in: "Calcium Chloride in Liquid Feed Supplements" NFIA Counter Oct. 14–16, 1973, pp 115–129, by Grosso et al, the inventors named in the aforementioned patent.

It is also known that solid feed supplements can be obtained by the addition of certain gelling agents to molasses. This practice has resulted in commercial acceptance of "poured chemical blocks". The poured chemical blocks are either soft blocks formulated with lime and phosphoric acid at an acidic pH (3.0 to 6.5) as described in U.S. Pat. Nos. 4,027,043 and 4,160,041, or hard blocks in which the formulation contains substantial amounts of alkaline additives, usually magnesium oxide, as described in U.S. Pat. Nos. 4,431,675; 4,171,385; 4,171,386; and 4,265,916; New Zealand Patent 170505, Australian Patent 438,073; and U.K. Patent 1,356,954. Hard blocks prepared by the methods of the latter patents have pH values from 9.5 to 10.5.

OBJECTIVES OF THIS INVENTION

It is an objective of this invention to provide animal feed supplements animal feed from by-products of the dairy and fermentation industries.

It is a further objective of this invention to provide animal feed supplements from dairy and fermentation by-products as stable suspensions.

It is a specific objective of this invention to provide stable animal feed suspensions of feed nutrients from dairy by-products such as whey permeates, which heretofore, have presented disposal problems to the dairy industry.

It is also a specific objective of this invention to provide stable animal feed suspensions of feed nutrients in yeast concentrates from the fermentation industries, such as whey sweet water and sweet water.

Other and related objectives will be apparent from the following description of the invention.

BRIEF STATEMENT OF THE INVENTION

This invention comprises stable animal feed supplement suspensions with liquid gels formed from dairy by-products such as whey permeates, delactosed whey, and fermentation by-products such as whey and corn sweet water. The invention also comprises the methods for formation of stable feed supplements from these by-products. These by-products have not been used with any significant success in animal feed supplements, despite their low cost and disposal problems. A major disadvantage is the limited solubility of lactose and proteins in the by-products, and the resultant instability of concentrates of the by-products. The invention comprises the treatment of the protein-rich by-products with a mild enzymatic treatment which stabilizes the by-products against protein gelation, and the thermal, and/or enzymatic treatment of the lactose-rich by-products to prevent separation of the lactose from concentrates. The stabilized concentrates are treated with gelation agents such as clays or gums and, preferably phosphoric acid and lime to form stable liquid gels, to which solid feed nutrients can be added in the preparation of an animal feed supplement.

DESCRIPTION OF THE PREFERRED EMBODIMENTS

As previously mentioned, the feed supplement is prepared from whey and its related by-products, or from sweet waters which are by-products from fermentation of corn and whey by-products. The useful by-products are described in the following paragraphs.

USEFUL WHEY BY-PRODUCTS

Whole whey is a dilute solution of lactalbumin, lactose, some fats, and the soluble inorganics from the parent milk.

The whey is commonly condensed and spray dried to a powder or is condensed to about 40 to 60 percent solids, the balance being water, and preserved. A typical analysis is as follows:

TABLE 1

Composition of a Typical Dried Whey

| | |
|---|---|
| Protein | 12.0% |
| Fat | 0.7% |
| Lactose | 60.0% |
| Phosphorous | 0.79% |
| Calcium | 0.87% |
| Ash | 9.7% |

Delactosed whey results from lactose crystallization from whole whey, and consequently has a greater concentration of protein and ash. A typical analysis of delactosed whey is as follows:

TABLE 2

Composition of a Typical Delactosed Whey

| | |
|---|---|
| Protein | 24.0% |
| Fat | 1.0% |
| Lactose | 50.0% |
| Ash | 20-25% |
| Salt | 5-7% |

Most delactosed whey is used as an ingredient in milk replacers and other relatively high end value products. There is a significant quantity of this by-product, however, which is not suitable for such end uses, frequently because of low protein or high salt contents. The use of this product in animal feed supplements is hindered as it is impractical to concentrate delactosed whey, as gels are formed in concentrates with solids over 35 weight percent. Additionally, the maximum solubility of lactose at ambient temperatures is about 20 weight percent, and lactose will crystalize from delactosed whey when cooled to ambient temperatures.

Whole whey is also treated to recover the milk proteins by membrane filtration which separates the proteins which cannot pass through the membrane. The whey permeate which is produced as a by-product of this treatment has greatly increased lactose and decreased protein contents. The raw permeate is concentrated, usually to 50–55% solids. This concentrate must be stored and handled at elevated temperatures, as its content of lactose exceeds the solubility of lactose at ambient temperatures.

A typical analysis of the permeate (commonly referred to as PERMEATE 90), on a dry weight basis, is as follows:

TABLE 3

Composition of a Typical Whey PERMEATE 90

| | |
|---|---|
| Protein | 2.0% |
| Fat | 1.0% |
| Lactose | 90.0% |
| Ash | 7.0% |
| Salt | 2.0% |

Lactose is frequently crystallized from the concentrated Whey PERMEATE 90, and the liquid remaining is commonly referred to as Whey PERMEATE 60. This liquid has a solids content of 50–55%, and a composition, on a dry weight basis, as follows:

TABLE 4

Composition of a Typical Whey PERMEATE 60

| | |
|---|---|
| Protein | 10.0% |
| NPN Protein | 8.0% |
| Lactose | 64.0% |
| Ash | 25.0% |
| Salt | 10.0% |

No useful products have previously been prepared from the whey PERMEATE 60, and the disposal of this product presents serious problems to the dairy industry. This by-product has not been accepted for use in animal feed supplements because it cannot be economically concentrated above 50–55% solids. Also, lactose is present in the product in excess of its solubility at ambient temperature, and permeates containing only 50–55% solids must be stored and handled at elevated temperatures.

USEFUL FERMENTATION BY-PRODUCTS

The fermentation industries produce large quantities of by-products rich in yeast proteins. A typical fermentation industry by-product is sweet water which is recovered from the residue remaining after distillation of ethanol. The residue from the distillation is screened to remove solids, and then concentrated to about 30% solids. Further concentration is impractical, as the yeast proteins form objectionable gels at higher concentrations. A typical analysis of sweet water from corn fermentation is as follows:

TABLE 5

Composition of a Typical Corn Sweet Water

| | |
|---|---|
| Protein | 38-42% |
| Fat & corn oil | 18% |

Whey is also used to manufacture ethanol, and the sweet water remaining from this manufacture has the following typical composition:

TABLE 6

Composition of a Typical Whey Sweetwater

| | |
|---|---|
| Protein | 19.0% |
| Fat | 1.0% |
| Lactose | 6.0% |
| Ash | 42.0% |
| Salt | 20.0% |
| Lactic Acid | 10.5% |

Disposal of the sweet waters presents a serious problem to the fermentation industries. Although these by-products have high protein contents with desirable amino acids profiles, they have not been accepted for use in animal feed supplements, because of the instability of the proteins upon concentration of the sweetwater.

TREATMENTS OF THIS INVENTION

I have found that any of the aforementioned by-products of the dairy and fermentation industries can be used as ingredients in liquid animal feed supplements with appropriate pretreatment of the by-products or modification of the method for preparation of the liquid supplements.

In any economical application it is essential that the by-products be used in fairly high solids content, typically from 50 to 70%. At such concentrations, the proteins and/or sugars in the by-products are unstable, and successful use of the by-products thus requires a pretreatment which will prevent the instability occurring in the final liquid feed supplement.

The protein rich by-products such as delactosed whey and sweet waters from the fermentation industries can be used as feed ingredients in liquid supplements by a mild proteinase treatment, at temperatures from 100° to 150° F. under alkaline conditions, with a pH from 7.5 to 10, in the presence of a protease, e.g., ALCALASE, at a concentration from 0.5 to 5 weight percent. The treatment is conducted for 2 to 24 hours, sufficient for proteolytic digestion to reduce the viscosity of the liquid to about 1000 to 5000 cps. After treatment, an acid such as sulfuric or propionic acid, can be added to reduce the pH to a value of 2.5 to 4.

A suitable protease is commercially available as Alcalase from Novo Nordisk A/S, 2880 Bagsvaerde, Denmark. It is a general purpose protease from Subtilisin A, an endoproteinase, as its major enzyme. It is available in two activity grades; 2.4 L with an activity of 2.4 Anson Units per gram, and 0.6 L with an activity of 0.6 Anson Units per gram.

The whey by-products are concentrated to a solids content of 45 to 60 weight percent. The resultant concentrates are heated to a temperature a which all or most of the lactose is soluble, typically to 150° F. or greater, and a thixotropic gel is formed by incorporating a limited quantity of gelling agents with the hot whey by-product. Useful gelling agents are described hereinafter. After the gelling agent is incorporated in the hot whey by-product, the resultant mixture should be cooled slowly, preferably by holding and permitting it to cool slowly to ambient temperature.

I have found that lactose which normally crystalizes and separates as a bottom layer of insoluble crystals from concentrated whey by-products will remain suspended in the gel after it cools to ambient temperatures. The lactose crystals which are formed in the liquid gel, are very small and are dispersed throughout the liquid gel and do not separate as a solid phase.

Alternatively, the lactose in the whey by-products can be inverted to galactose, which has a greater solubility. The inversion is performed at mild conditions, with treatment temperatures from 80° F. to 110° F. for periods from 2 to 36 hours. The inversion is enzymatic, with a suitable lactase enzyme, such as LACTOZYM, which is available from Novo Nordisk, 2880 Bagsvaerd, Denmark. It is a preparation of B-galactosidase having an activity of 3000 LAU/ml (1 umol glucose release per minute at standard conditions). The inversion of the lactose also changes the flavor of the whey by-product and increases its sweetness, a change which can be of advantage in some applications, as it increases the palatability of the final product to some animals, such as dogs. The inversion is also beneficial as it avoids lactose intolerance in some animals.

The invention also includes the addition of a soluble bisulfite at trace to minor concentrations to the by-products prior to or during its treatment or heating to inhibit discoloration of the by-product. Brown discoloration can occur in the sweetwater by-products during the enzymatic hydrolysis treatment and in some whey by-products when they are heated sufficiently to solubilize lactose. I have found that this discoloration can be inhibited and effectively precluded by the incorporation of from 0.01 to 1.0, preferably 0.005 to 0.1, weight percent of bisulfite, as a soluble bisulfite salt, e.g., an alkali metal or ammonium bisulfite, or sulfurous acid in the by-product prior to or during the hydrolysis or heating step.

The whey by-products are also preferably stabilized against decomposition by adjusting the pH to no greater than 4.0 by the addition of phosphoric acid. A useful acidity range is from 2.5 to 4.0. A preservative such as low molecular weight (2 to 7 carbons) organic carboxylic acids such as benzoic acid, sorbic acid, propionic acid, butyric acid, etc., is also added in an amount from 0.01 to 1.0 weight percent, preferably from 0.05 to 0.5 weight percent.

THE GELLING AGENTS

Any of the gelling agents commonly used to prepare feed supplement suspensions from molasses can be used with the by-products in this invention. This includes expanding lattice clays such as attapulgite, gums such as guar gum, lecithin, and other proprietary products, e.g., GENUZAN, available from Hercules Incorporated, PFW Division, Wilmington, Del. These gelling agents are used at concentrations from 0.5 to 5.0 weight percent, preferably from 0.5 to 3.0 weight percent by dry weight of the final feed supplement and are incorporated into the by-product liquid with high shear mixing.

A preferred method employs a dispersion of the gelling agent in water, e.g., an aqueous clay dispersion containing about 25 weight percent clay and a polyphosphate dispersant such as sodium pyrophosphate. Similar dispersions of the gums can also be used. This method reduces time and labor and eliminates the need to install a high speed mixer to disperse the clay or gum in the feed supplement. Since the clay is not gelled in the aqueous dispersion a flocculent such as ammonium phosphate and polyphosphate and phosphoric acid are commonly added with clay dispersion to form a gel in the liquid supplement. Usually the flocculent is added to the supplement after the aqueous clay dispersion has been thoroughly mixed in the supplement mix.

The gelling agents which are incorporated in the by-products to form stable liquid gels are calcium oxide or hydroxide and phosphoric acid. The calcium oxide is preferably prepared as an aqueous solution of from 10 to 35, preferably about 30, weight percent. Alternatively a solution of calcium hydroxide can be prepared at similar concentrations.

The phosphoric acid which is used is preferably orthophosphoric acid, although acidic salts such as monoammonium dihydrogen orthophosphate can also be used. Polyphosphoric acid can also be used, as that acid is a mixture of orthophosphoric acid, pyrophosphoric acid and tripolyphosphoric acid.

The gelling agents are added in amounts sufficient to provide from 0.1 to 2.5 weight percent, each, of calcium and phosphorus in the final supplement. When the formulation requires a calcium or phosphorus content in excess of the amounts added as gelling agents, I prefer to add insoluble sources of calcium or phosphorus such as dicalcium phosphate, calcium bicarbonate, etc. to achieve the desired calcium and phosphorus contents.

THE FAT INGREDIENT

An animal-edible, normally solid fat can be added to the viscous liquid gel as an energy source. Useful animal edible fats are the edible fats and oils from animal and vegetable sources. The supplement prepared by the method of the invention can contain up to about 35 weight percent, based on the supplement weight, of edible fat. Preferably, the composition has from 13 to about 30 weight percent fat. These fats are mono, di- or tri-glycerides of various fatty acids such as stearic, palmitic, oleic, linoleic, lauric, etc.

Useful fats and oils can also include complex lipids such as the phospholipids, e.g., fatty acid esters of glycerol phosphate or lecithin, which also contain nitrogen bases such as choline. The fats are commonly identified by source, and suitable fats which can be employed include the oils, tailings or residues of the following: soy bean oil, corn oil, tallow, fish oil, coconut oil, palm oil, etc. Preferably, relatively inexpensive sources of fats are employed such as the yellow grease compositions which are reclaimed restaurant fats and greases, acidulated soap stocks or acidulated fats and oils. The fat ingredient can also contain an antioxidant in an effective amount to inhibit oxidative degradation of the fat, e.g., from 0.01 to about 1 weight percent butylated hydroxyanisole, butylated hydroxytoluene, 4-hydromethyl-2, 6-3,di-tert-butylphenol, etc.

Normally solid animal edible fats are the most widely available and are preferred. These fats have high melting points in excess of ambient temperatures, i.e., in excess of 65°–80° F. The solid fat is heated sufficiently to melt the fat and the resultant, hot fat liquid is then added to the viscous gel which is also warmed to the fat melting temperature, while stirring the mixture sufficiently to disperse the fat intimately through the viscous gel carrier. No emulsifying or stabilization agent is necessary, for if the fat is adequately dispersed into the liquid gel carrier, the fat subdivides into small particles which solidify and form a suspension in the viscous liquid carrier. Acidulated fats, which can have free fatty acid contents of 40% to 70% can also be used. These fats are often liquid at room temperatures. With high fat content suspensions (those containing over 20% fat) the quantities of water in the supplement must be increased when the fat contains quantities of free fatty acids in excess of 25 weight percent, as these fats tend to increase the viscosity of the final product to a greater extent than do fats with low contents of free fatty acids. The fat is mixed with the liquid gel at concentrations sufficient to provide from 5 to 40 weight percent fat in the final supplement. Preferably the fat is added at concentrations from 12 to about 35 weight percent fat.

POWDERED INSOLUBLE FEED NUTRIENT

If desired, a powdered water insoluble nutrient can also be added to the liquid gel. This can be any animal feed nutrient which is substantially insoluble in water. Examples of desirable additives that can be suspended in the gelled sugar solution prepared by the invention comprise calcium carbonate, magnesium carbonate, calcium sulphate, or calcium phosphate. All of the aforementioned comprise inorganic nutrients and sources of elements needed for a balanced diet, such as calcium, magnesium or phosphorous.

Other water insoluble nutrients in powder form that can be added include those which can supply the animal's protein requirements such as: dried blood or meat meal from rendering plants which also serve as a phosphorous source, cottonseed meal, soymeal, dehydrated alfalfa, dried and sterilized animal and poultry manure, fishmeal, powdered egg, and dried fish solubles. The fish solubles is a dried concentrate of the cooking water from a fish cannery which has a very high protein content.

The water insoluble solid animal feed nutrient is added to the gel in powdered form. Preferably, the solid is of a size range passing a 20 mesh U.S. standard screen and, most preferably, of a size range passing a 100 mesh standard U.S. Screen. The solid can be powdered to any further degree of fineness and the limit on the minimum particle size is controlled only by the economics and cost of finally subdividing the solid material. Typically a size range processing a 100, and retained on a 300, U.S. standard screen can be used.

PROTEIN EQUIVALENT INGREDIENTS

When the feed supplement is intended for consumption by ruminants, a non-protein nitrogen compound such as urea, biuret or mono or de-ammonium phosphate can be used to supply the protein nitrogen dietary requirements of the animals.

Generally, the feed supplement should not contain more than 40 weight percent equivalent protein content from a protein or non-protein nitrogen compound and the upper limit for the concentration of urea in the supplement corresponds to this maximum equivalent protein content. A typical ruminant feed would, therefore, contain from 5 to about 15, preferably from 7 to about 12 weight percent urea as a source of non-protein nitrogen.

OTHER FEED INGREDIENTS

Other feed ingredients which can also be added to the supplement include ammonium sulfate, sodium chloride or potassium chloride in an amount from 0.5 to 15 weight percent of the supplement. These salts are particularly desirable additives for cold weather applications as they will reduce the freezing point of the suspension to appropriately low values, e.g., 0° F. and even to −10° F. In some applications it may be necessary to add microicides such as propionic acid, benzoic acid, or sodium bisulfite to stabilize the supplement against bacteria and yeasts. In those applications, propionic acid at a concentration of 0.1 to 0.5 weight percent, or sodium bisulfite at a concentration of 0.5 to 1.0 wight percent. are effective in preventing growth and development of bacteria and mold.

The content of minerals, as well as other ingredients such as drugs, vitamins, etc., can be varied as desired for specific applications. Examples of various minerals are manganese, iodine, zinc, copper, cobalt and iron compounds. In some specific applications, a high content mineral supplement is desirable, e.g., containing from 6 to 10 percent of mineral salts, added as finely divided powders. These salts can be water insoluble salts such as dicalcium and tricalcium phosphate or can be water soluble salts such as monoammonium phosphate. Examples of vitamins include Vitamin A, Vitamin D, and Vitamin E.

Examples of useful drugs are: growth promoting food additives or drugs such as MONISON, commercially available under the designation RUMENSIN from Eli Lilly Co.; chlorotetracyline and sulfamethiazine; and mixtures of chlorotetracyline and sulfamethiazine; etc. Other useful drugs include anti-bloat and anthelmintic agents as well as insect control agents. The aforementioned materials are used in effective concentrations for the desired result, e.g., drugs are used at concentrations from 0.1 to about 1.0 weight percent. The minerals are usually used in similar concentrations, but are often expressed in amounts from 3 to about 500 milligrams per pound and vitamins are frequently expressed from 10 to about 50,000 units per pound.

THE METHOD

The order of addition of the ingredients of the supplement is significant, as the required quantities of water and ammonium phosphate gelling agent should be added to the sugar solution and thoroughly dispersed therein to form the viscous liquid gel prior to the addition of all the required amount of water and prior to the addition of the melted fat ingredient. If all the water is added to the sugar solution before or during the addition of the ammonium phosphate, the thixotropic properties of the liquid gel are diminished or, in some cases, a liquid gel cannot even be obtained. Accordingly, it is preferred to form the gel in feed solutions having at least 50° Brix. This insures that the carrier is available as a thixotropic medium that suspends the fat particles as they are formed in the supplement upon the addition of the melted fat. When the fat is added to the sugar solution before formation of the dilute, viscous gel, the fat particles cannot be completely dispersed and readily settle and separate from the carrier.

Thereafter the other feed ingredients are added to the resulting thixotropic suspension of fat in a viscous liquid gel carrier.

The invention will be described with reference to the following examples which serve to illustrate the practice of the invention and demonstrate its results.

Example 1

The following experiments will illustrate the treatment of sugar and protein containing by-products and the preparation of stable liquid suspensions suitable for animal feed supplements from the treated by-products.

The following by-products are treated:

|  | Corn Sweet Water (CSW) | Delactosed Whey (DW) |
| --- | --- | --- |
| Protein | 12.0% | 8.5% |
| Fat | 5.5% | 0.4% |
| Sugars |  | 17.5% |
| Ash |  | 7.0% |
| Salt |  | 2.0% |
| Solids Content | 30.0% | 35.0% |

A blend of equal volumes of corn sweet water and delactosed whey was also prepared and used in the experiments.

Each of the three liquid by-products was treated enzymatically as follows:

The pH of each liquid was adjusted to 7.5 by the addition of sodium hydroxide, when necessary, and 0.1 weight percent of alcalase (2.4 L standardized solution) was added. The resultant solutions were heated to 125° F. and maintained at that temperature for 12 hours.

The solutions are concentrated after the enzymatic treatment by vacuum evaporation at 160° F. and 60 millimeters Hg pressure. As the enzyme is deactivated when heated to 160° F. or above for several minutes, the concentration step also stops further enzymatic action. The resultant liquids had the following concentrations: CSW: 52%; Blend: 56%; and DW: 51%, all expressed as weight percent solids.

Liquid suspensions were prepared from the treated liquid by-products. The following table summarizes the ingredients in parts by weight which were used to prepare the liquid suspensions:

| Ingredients | 1 | 2 | 3 |
| --- | --- | --- | --- |
| Water | 10 | 10 | 10 |
| Hydrated Lime | 5 | 5 | 5 |
| Liquid By-Product | 200(CSW) | 200(BLEND) | 200(DW) |
| Propionic Acid | 1 | 1 | 1 |
| Phosphoric Acid (75%) | 20 | 20 | 20 |

The procedure followed in all examples was to dissolve hydrated lime in water, mix the lime solution with the liquid by-product, and add phosphoric acid, and a preservative, usually propionic acid, to stabilize the suspensions against microbial activity. The ingredients were mixed in a laboratory mixer at moderate speed which varied from 200 to 1000 rpm as required by visual observation of the mixing.

The final pH values of the suspensions were 4.0 to 4.1 and exhibited the following viscosities:

| pH | pH 7 | pH 4 |
| --- | --- | --- |
| CSW | 6000 cps | 1200 cps |
| DW | 3000 cps | 1500 cps |
| BLEND | 12000 cps | 1800 cps |

The suspensions were stable and thixotropic and suitable for use as liquid feed supplements at a pH value of 4.0. The suspensions at higher pH values exhibited viscosities above the optimum range (1500 to 3000 cps). At the higher pH values (7.0) the suspensions could be used for feed supplements by dilution with water to reduce their viscosities to the optimum range.

Other feed nutrients can be added to the suspensions, such as fat, protein meals, calcium carbonate, etc., in amounts up to 30–35 weight percent, without experiencing instability or excessive viscosities.

Example 2

A concentrated by-product, Permeate 60, was processed to prepare a stable suspension with a viscosity suitable for preparation of a feed supplement. The by-product had the following composition on a dry basis:

| protein | 10.0% |
| --- | --- |
| lactose | 64.0% |
| ash | 25.0% |
| salt | 10.0% |

The by-product had a concentration of 50 weight percent solids and approximately 10 weight percent lactose crystals settled from the liquid when standing at room temperature.

The by-product was heated to 110° F.–115° F. to dissolve all the lactose, and an aqueous solution of hydrated lime (2 parts) in water (3 parts) was added to 400 parts of the by-product. The pH of the resultant mixture was 10. Fifteen parts of 75% phosphoric acid as added, sufficient to reduce its pH to 4.0, and 2 parts propionic acid was added to the resultant liquid gel.

After storage at room temperature for 24 hours, the liquid gel was inspected and found to be stable, without any sediment or settled lactose crystals and was a thixotropic liquid with a viscosity of 3000 cps. Inspection a week later revealed that the liquid gel was unchanged.

Example 3

A sample of sweet water concentrate from whey fermentation was treated in accordance with this invention. The sweet water concentrate had the following composition:

|  | Percent (dry basis) |
| --- | --- |
| Protein | 18% |
| Sugar | 10% |

The concentrate had 30 percent solids content. Sufficient sodium hydroxide was added to raise the pH of the concentrate to 8.0, and 0.1 weight percent proteinase (alcalase) was added and the resultant solution was heated to and maintained at 125° F. for two days.

After the second day, the liquid was concentrated to 52 weight percent solids by vacuum evaporation to yield a stable liquid having a viscosity of 2100 cps. It is suitable for use as a liquid feed, however, it can also be used as a carrier for additional feed ingredients by the following treatment.

The liquid is mixed with water in weight proportions of 30 parts water to 230 parts liquid and five weight parts of hydrated lime are added, followed by thirteens weight parts of 75% phosphoric acid, resulting in the formation of a thixotropic liquid gel. The liquid is preserved by the addition of 4 parts potassium sorbate and 70 parts of tallow are added at 110° F., sufficient heat to melt the tallow.

The resultant product is a thixotropic suspension of fat which is stable upon prolonged storage without separation. It has a viscosity, on standing, of 5000 cps and is useful as a liquid feed supplement.

Example 4

A whole whey solution (4300 grams) containing 32 weight percent lactose, 6.4 weight percent protein and 53 weight percent solids was treated enzymatically by adding sufficient sodium hydroxide to raise its pH to 8.0, four milliliters of alcalse 2.41 was added and the mixture was heated to and maintained at 110° F. overnight. The viscosity of the whey was measured before treatment and found to be 2100 cps, and after treatment to be 100 cps, indicating that the proteins had been fragmented sufficiently to destroy their gelling tendencies. The whey was then tested to determine the solubility of lactose at various temperatures. Samples of 200 milliliters of the whey were stored at temperatures of 35°, 110° and 170° F. and inspected for viscosity and volume of precipitate. The data were as follows:

| Temperature (°F.) | 35 | 70 | 110 | 170 |
|---|---|---|---|---|
| Viscosity (cps) | 100 | 100 | 100 | 100 |
| Vol. of precipitate (%) | 27 | 17 | 3 | 0 |

The precipitates in the samples were chiefly lactose crystals which had a coarse grainy appearance and feel.

The treated whey was then heated to 170° F. and 200 gram samples were processed into stable suspensions using the following gelatin additives: ammonium polyphosphate (10-34-0), 10-34-0 hydrated lime, orthophosphoric acid, orthophosphoric acid and hydrated lime, gums (GENSUAN 1063 and GENSUAN 1038), attapulgite clay and MINUGEL (clay). The following table summarizes the ingredients in parts by weight:

| Ingredient | Control | 2 | 3 | 4 | 5 | 6 | 7 | 8 | 9 |
|---|---|---|---|---|---|---|---|---|---|
| Whey | 200 | 200 | 200 | 200 | 200 | 200 | 200 | 200 | 200 |
| 10-34-0 | 0 | 10 | 0 | 10 | 0 | 0 | 0 | 0 | 0 |
| Orthophosphoric Acid | 0 | 0 | 10 | 0 | 10 | 0 | 0 | 0 | 0 |
| Lime 67% solution | 0 | 0 | 0 | 10 | 0 | 0 | 0 | 0 | 0 |
| Lime 67% solution | 0 | 0 | 0 | 0 | 10 | 0 | 0 | 0 | 0 |
| GENSUAN 1063 | 0 | 0 | 0 | 0 | 0 | 2 | 0 | 0 | 0 |
| GENSUAN 1038 | 0 | 0 | 0 | 0 | 0 | 0 | 2 | 0 | 0 |
| Attipulgite clay | 0 | 0 | 0 | 0 | 0 | 0 | 0 | 6 | 0 |
| MINUGEL | 0 | 0 | 0 | 0 | 0 | 0 | 0 | 0 | 6 |

The samples were permitted to cool to room temperature and were tested for pH value, viscosity at rest, stirred viscosity, and for volume of precipitate after standing for 24 hours. The following table summarizes the results:

| | Control | 2 | 3 | 4 | 5 | 6 | 7 | 8 | 9 |
|---|---|---|---|---|---|---|---|---|---|
| pH | 7.4 | 4.5 | 6.5 | 5.2 | 8.8 | 7.0 | 7.0 | 6.8 | 6.9 |
| Viscosity (1000 cps) | | | | | | | | | |
| at rest | 0.1 | 1.8 | 2.1 | 30 | 26 | 18 | 10 | 18 | 25 |
| stirred | — | 0.1 | 0.6 | 0.5 | 18 | 8 | 4.5 | 1.8 | 10 |
| Precipitate | yes | no | no | no | no | no | no | no | no |

It was observed that all the gelling agents effectively prevented separation of lactose crystals and formed thixotropic suspensions of very fine crystals. In the control sample the lactose crystals formed as large, sand-like solids which precipitated from the whey. In the samples containing the gelling agents, the lactose crystals which formed were very small and remained suspended in the whey.

Samples 5 through 9 were slightly higher in viscosity than desired for use as an animal feed suspension. Reduction of the quantities of gelling agents in these solutions to half the amounts used in the experiments yielded thixotropic suspensions which were entirely suited for use as animal feed suspensions.

The whey suspensions obtained in the experiment can be used directly as animal feed suspensions, or can be used as stock suspensions to which can be added other feed nutrients such as fat, calcium carbonate, calcium phosphate, etc.

The invention has been described with reference to the illustrated and presently preferred embodiment. It is not intended that the following claims be limited to the illustrated embodiments, but rather that the invention be defined by the steps and conditions, and their obvious equivalents set forth in the following method claims, and the ingredients and their obvious equivalents set forth in the following product claims.

What is claimed is:

1. A method for the preparation of a stable liquid suspension of nutrients useful as a feed supplement which comprises:

a. heating a supersaturated aqueous whey by-product containing lactose at a concentration exceeding its solubility at room temperature to a temperature from 100° to 200° F. and sufficient to dissolve all the lactose in said by-product, b. adding a gelling agent selected from the group consisting of expanding lattice clays, gums, and mixtures of calcium oxide or hydroxide and phosphoric acid to the aqueous whey by-product in an amount sufficient to form a liquid gel at the aforesaid temperature; and c. cooling said liquid gel to room temperature to obtain a thixotropic suspension of non-agglomerated lactose crystals dispersed in said liquid gel.

2. The method of claim 1 wherein said gelling agent is a mixture of phosphoric acid and lime.

3. The method of claim 2 wherein said phosphoric acid and lime are incorporated in said solution at a concentration from 0.1 to 2.5 weight percent each, expressed as phosphorus and calcium.

4. The method of claim 1 wherein said aqueous whey by-product also contains protein in excess of 5 weight percent and in sufficient amount to form protein gels in said solution at ambient temperature, including the step of treating said whey by-product with a proteinase at conditions sufficient to digest said protein and prevent the formation of a protein gel.

5. The method of claim 4 wherein said aqueous whey by-product is heated to a temperature of 100° F. to 150° F. and maintained at that temperature during digestion.

6. The method of claim 5 wherein said proteinase is used at a concentration of 0.5 to 5 weight percent at a pH from 7.5 to 10.

7. The method of claim 6 wherein said digestion is practiced for 2 to 24 hours.

8. The method of claim 4 including the step of adding from 0.01 to 1.0 weight percent bisulfite to said aqueous whey by-product.

9. The method of claim 1 including the step of incorporating an edible fat in said thixotropic suspension in an amount sufficient to provide from 5 to 40 weight percent fat in said feed supplement.

10. The method of claim 9 wherein said fat is added to said thixotropic suspension at a temperature above its melting point.

11. The method of claim 1 including the step of incorporating a solid animal feed nutrient in an amount up to 35 weight percent in said thixotropic suspension.

12. The method of claim 11 wherein said solid animal feed nutrient is limestone flour.

13. The method of claim 11 wherein said solid animal feed nutrient is protein-containing solid.

14. The method of claim 13 wherein said solid animal feed nutrient is a protein meal.

15. The method of claim 1 including the step of incorporating a non-protein nitrogen compound in said thixotropic suspension.

16. A method for the preparation of a stable liquid suspension of nutrients from an aqueous fermentation by-product containing protein in excess of 5 weight percent and in sufficient amount to form protein gels in said fermentation by-product at ambient temperature, which method comprises:

a. heating said fermentation by-product to a temperature from 100° to 150° F. and treating said fermentation by-product with a proteinase at conditions sufficient to digest said protein and prevent the formation of a protein gel;

b. adding a gelling agent selected from the group consisting of expanding lattice clays, gums, orthophosphate salts and mixtures of calcium hydroxide and phosphoric acid to the aqueous fermentation by-product in an amount sufficient to form a liquid gel to the aqueous fermentation by-product at the aforesaid temperature; and c. cooling said liquid gel to ambient temperature to obtain a thixotropic suspension of non-agglomerated lactose crystals dispersed in said liquid gel.

17. The method of claim 16 wherein said gelling agent is a mixture of phosphoric acid and lime.

18. The method of claim 17 wherein said phosphoric acid and lime are incorporated in said fermentation by-product at a concentration from 0.1 to 2.5 weight percent each, expressed as phosphorus and calcium.

19. The method of claim 16 including the step of adjusting the pH of the liquid gel to a value no greater than 4.0 by the addition of phosphoric acid thereto.

20. The method of claim 19 including the step of incorporating an organic carboxylic acid having from 2 to 7 carbons in said liquid gel in an amount from 0.01 to 1.0 weight percent and effective as a bacteriostat.

* * * * *